United States Patent [19]

Torok et al.

[11] Patent Number: 4,838,637

[45] Date of Patent: Jun. 13, 1989

[54] INTEGRATED SOLID STATE NON-VOLATILE FIBER OPTIC SWITCHBOARD

[75] Inventors: Ernest J. Torok, Minneapolis; John A. Krawczak, Minnetonka; Bernard S. Fritz, Eagan; William A. Harvey, St. Paul, all of Minn.

[73] Assignee: Unisys Corporation, Blue Bell, Pa.

[21] Appl. No.: 45,481

[22] Filed: May 4, 1987

[51] Int. Cl.⁴ .............................................. G02B 6/32
[52] U.S. Cl. .............................. 350/96.18; 350/96.19; 350/355; 350/375
[58] Field of Search ............... 350/96.15, 96.16, 96.17, 350/96.18, 96.19, 353, 355, 370, 374, 375, 162.2, 162.23

[56] References Cited

U.S. PATENT DOCUMENTS

| Re. 30,723 | 8/1981 | Heine | 369/44 X |
| 3,885,094 | 5/1975 | Russell | 369/44 |
| 4,355,864 | 10/1982 | Soref | 350/96.18 |

Primary Examiner—William L. Sikes
Assistant Examiner—Frank González
Attorney, Agent, or Firm—Glenn W. Bowen

[57] ABSTRACT

A fiber-optic switchboard is developed consisting of a plurality of n input fibers, n input lenses, n light deflecting elements, n relay lenses, a multifaceted reflector, m output lenses, and m output fibers. Each input lens causes an image of the end of the corresponding input fiber to fall on its deflecting element, while each relay lens causes an image of the corresponding deflector element to fall on the proper facet of the multifaceted reflector. Each output lens causes an image of the multifaceted reflector to fall on the face of the corresponding output fiber. The output lenses are placed such that each deflecting element is capable of directing light through any output lens and into the corresponding output fiber.

21 Claims, 3 Drawing Sheets

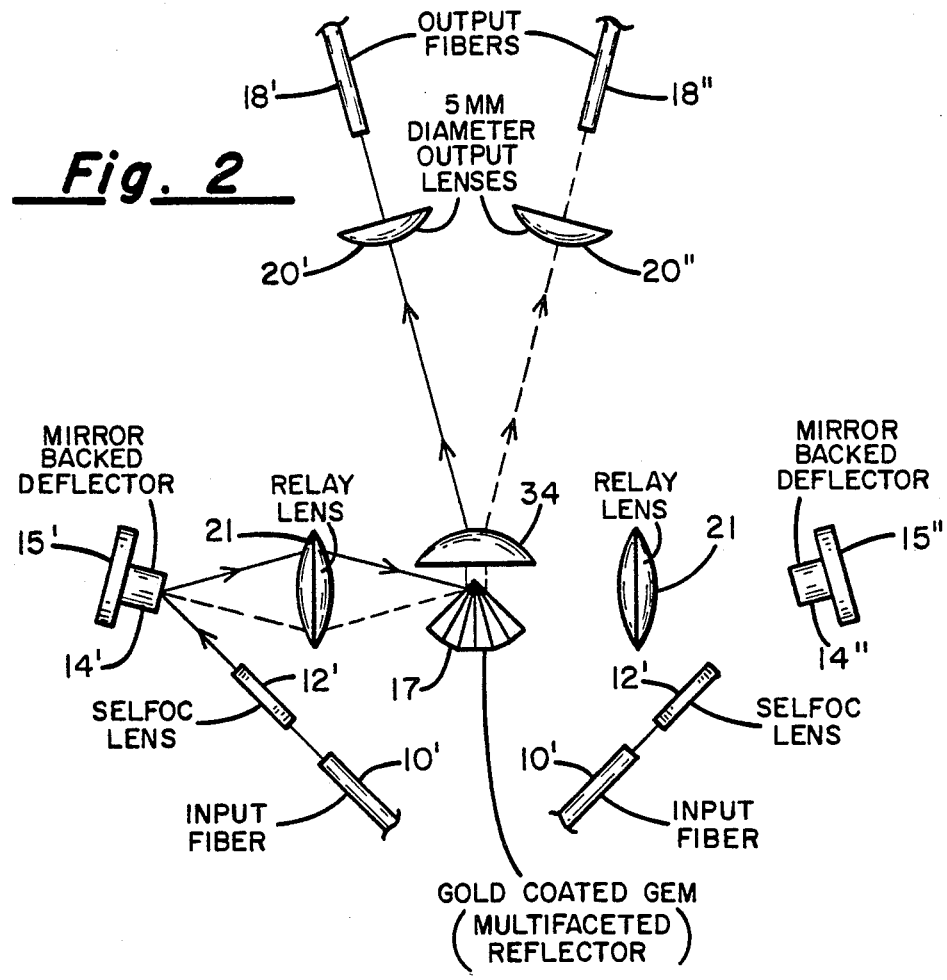
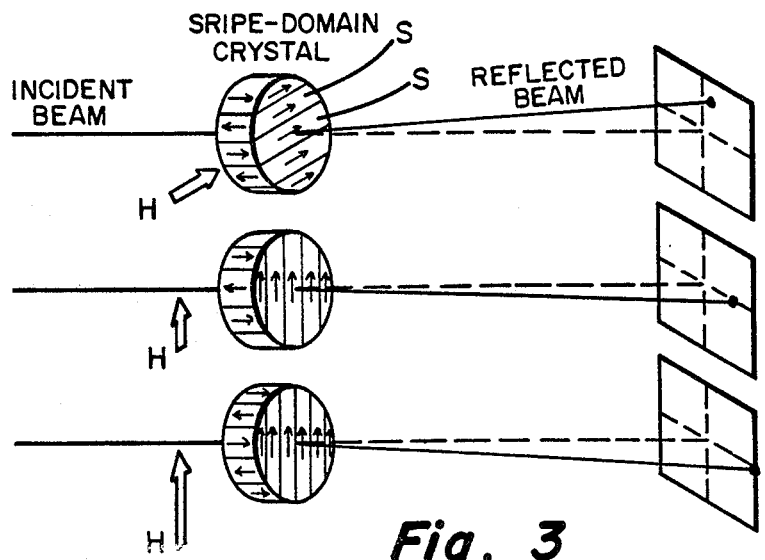

INTEGRATED SOLID STATE NON-VOLATILE FIBER OPTIC SWITCHBOARD

BACKGROUND OF THE INVENTION

Prior art fiber-optic switchboards using light deflectors may be understood by reference to FIG. 1. In this figure, there is shown an array of input fibers and an array of output fibers. Each input fiber 10 has its own input lens 12 which collimates the light from its fiber. The collimated light from the input fibers falls on an array of deflector elements 14 backed by a mirror 16. There is one deflector element for each input fiber which deflects the light of its input fiber to any one of the output fibers 18. Each output fiber has its own output lens 20, whose function is to focus the collimated light into the associated output fiber. Thus any input fiber can have its light directed into any output fiber, and all fibers can be active at once.

The above configuration, however, is unsatisfactory for the following reasons:

1. The deflector must be very accurate and repeatable in order to get the beam into the output fiber. For example, if the output lens has a 10 mm focal length, and the acceptable deviation in position in the output spot is 25 $\mu$m, then the required accuracy of the deflector must be within 0.15°.

2. The inhomogeneity in the deflector, which, for example, may be a conventional programmable or controllable light deflector on a diffraction grating of the type shown in U.S. Pat. No. 3,752,563 entitled Magnetic Film Stripe Domain Diffraction which issued in the name of Ernest J. Torok, David S. Lo and David I. Norman to the assignee of the present invention on Aug. 14, 1973, with variable grating spacing and orientation, must likewise be very small (0.15° or 2.5 m rad).

3. The acceptance angle of the output fiber is greatly exceeded by the angle of incidence of the light from the array of input fibers. The further the input fibers are from each other, the larger the angle of incidence, and the greater the problem. Even if the input lenses were only 2 mm in diameter, a hexagonal array of 37 input lenses would have a maximum angle of incidence of 35° which exceeds the acceptance angle of the output fiber by a factor of about 2.

The present invention furnishes a fast switching, compact, non-blocking fiber-optic switchboard with no moving parts which is capable of switching any input fiber to any output fiber when all inputs and outputs are simultaneously operating so that light from an input fiber may be deflected by a light deflecting element into any one of many output fibers.

BRIEF DESCRIPTION OF THE DRAWINGS

The present invention is described with reference to the drawings in which:

FIG. 2 is a schematic representation of one embodiment of the present invention in which two input and two output fibers are shown to illustrate the principles of the invention;

FIG. 3 is a perspective view of a stripe domain deflector element;

TECHNICAL DESCRIPTION OF THE INVENTION

Figure 1:
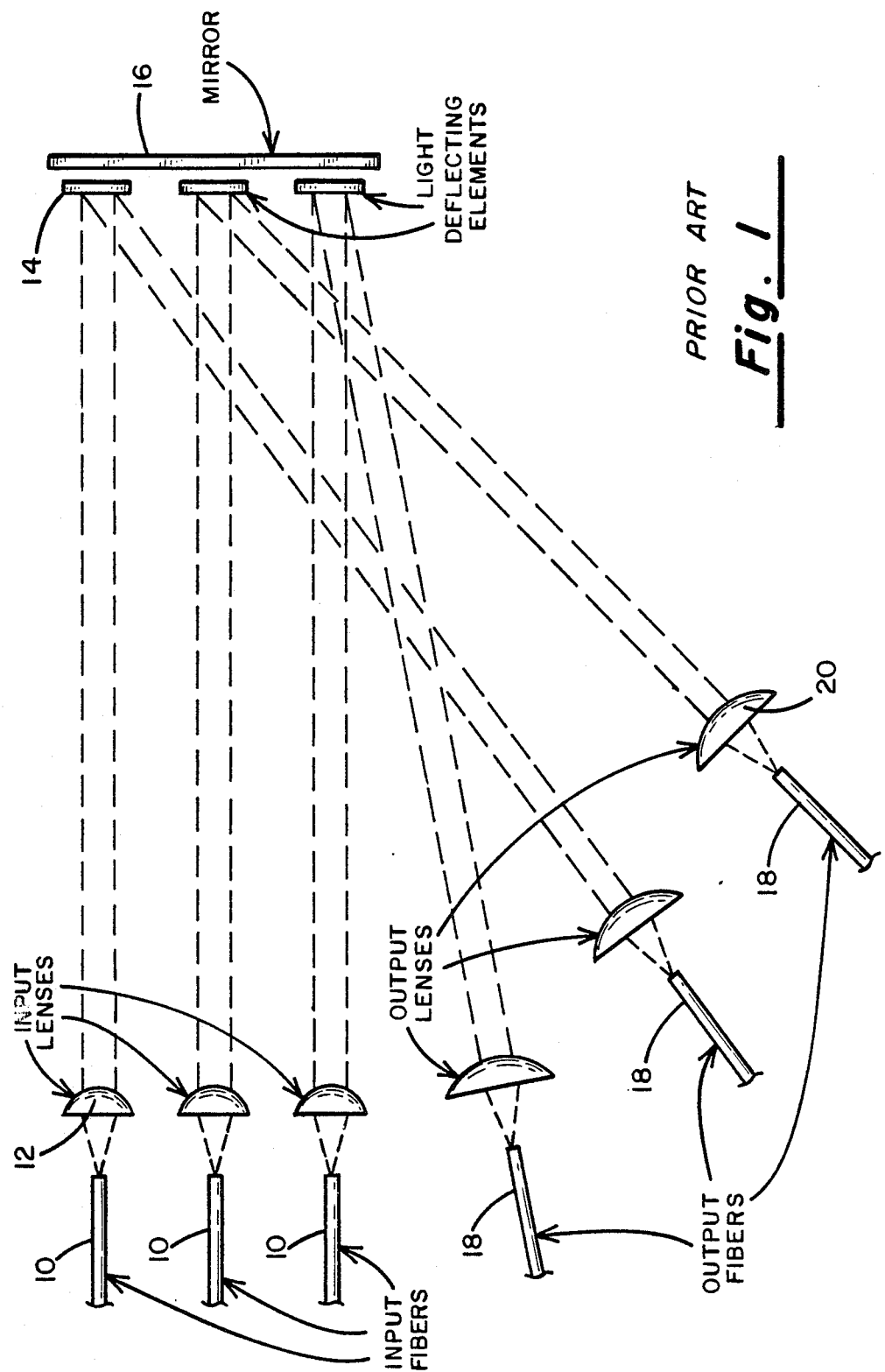
FIG. 1 is a schematic representation of a prior art optical switchboard.

The present invention provides a cross bar switchboard for optical fibers. The switchboard is all optical, solid state (i.e., no moving parts). It is rugged, operationable over a wide temperature range, fast (2 $\mu$sec.), nonblocking, latching (i.e., nonvolatile), requires no initial polarization, capable of switching both digital and analogue signals, and is expected to be capable of handling very large numbers of inputs and outputs in a single stage. The light is deflected from an input fiber to any output fiber by a stripe domain deflection element, so there are no splitting losses, and the efficiency does not decrease as more output fibers are added.

The present invention is illustrated by reference to FIG. 2 in which each input lens 12', which preferably is a Selfoc ® gradient index lens, does not collimate the light from its input fiber 10', but instead forms an image of the face of its input fiber on the face of its associated deflector element 14', which may be a mirror-backed magnetic stripe domain deflector that can be operated to deflect reflected light by controlled amounts as noted above using devices described in the Torok et al U.S. Pat. No. 3,752,563. Stripe domain films are made by liquid phase epitaxy. A 20 mil thick transparent non-magnetic single crystal garnet substrate, such as gadolinium gallium garnet ($Gd_3Ga_5O_{12}$) is dipped into a melt and a 25 $\mu$m bismuth substituted rare earth iron garnet film (for example $Bi_{0.9}L\mu_{2.1}Fe_5O_{12}$) is grown. The film is magnetic with a $4\pi M$ of 1800 Oe and a uniaxial anisotropy field of approximately 150 Oe with easy axis normal to the film plane. Long straight regularly spaced magnetic domains form spontaneously in such films, as shown in FIG. 3. Both the orientation and spacing (grating constant) of these domains can be changed by application of an external magnetic field, H that may be supplied from bulk wound or small, fast response stripline coils.

The stripes align themselves parallel to the direction of the field, and the stripe spacing varies inversely as the strength of the applied field. A 25 $\mu$m film, for example, may have stripes S whose grating constant can be varied from 7 $\mu$m to 2 $\mu$m. This corresponds to a change of deflection angle of 14° in the polar direction and 360° in the azimuthal direction. The magnetization in the film is nearly normal to the film plane, and has only a small in-plane component. The normal component alternates from stripe to stripe in order to minimize the demagnetizing energy. When light is passed through the film, the part that passes through one stripe has its polarization rotated by an amount FD where F is the Faradic constant of the material and D.C. is the film thickness.

The light that passes through the adjacent stripe has its polarization rotated an angle $-FD$. The film acts as a phase diffraction grating whose diffraction efficiency depends on the film thickness. For example, when each stripe rotates the polarization 90 degrees, the zero order disappears entirely, and all light goes into the higher orders. When the film is thick enough, and the incident light enters at an angle to the normal, all orders become negligible except the one that exits at an angle nearly equal and opposite in sign to the entrance angle, i.e., the Bragg angle. The deflection efficiency in this case can be shown to be:

$$Eff = exp(-\alpha D) \sin^2(2FD/\pi)$$

where $\alpha$ is the absorption in nepers/cm, and F is the Faraday coefficient of the film in radians/cm. For light of wavelength 0.8μm, a good film will have $\alpha=86$ nepers/cm and $F=104$ rad/cm. Film compositions with much higher bismuth content have been made, but not perfected. They have F as high as 270 rad/cm. When a mirror is deposited behind a stripe domain deflector, the rotation of the polarization in each stripe is doubled, and the deflection efficiency is increased as if the film were twice as thick. If a partially reflecting layer is put on the other surface, so that the film is enclosed in a resonant optical cavity, or etalon, the efficiency Eff can be shown to be:

$$Eff = (4F/\pi)^2 (\alpha + (\alpha^2 + (4F/\pi)^2)^{\frac{1}{2}})^{-2}$$

This offers an advantage in higher efficiency as well as the convenience of using a thinner film. For example, a 25 μm thick film with $F=104$ rad/cm and $\alpha=86$ nep/cm has an efficiency of only 2%. When a mirror is placed behind it, the efficiency rises to 7%. When an etalon is formed by placing a partially reflecting layer on the other side of the deflector, the efficiency rises to 30%. Without that partially reflecting layer, the maximum deflection efficiency is 20% and is obtained when the film thickness is 75 μm. Future films with $F=270$ should yield Eff=61%. Since the Faraday effect rotates the polarization angle of an incoming beam regardless of the initial polarization angle, the deflector works for any polarization at all or any superposition of polarization; thus, a stripe domain light deflector works for unpolarized light. The strip domain film thus acts as a two dimensional light deflector where the stripes align themselves with an applied magnetic field, and rotate when the field rotates. The spacing of the stripes S becomes smaller as the field is increased. A mirror applied to the back of the stripe domain element may serve as a deflector to deflect reflected light at a variable angle according to the magnitude and direction of an applied magnetic field so light from the right is reflected back to the right after passing through the stripe domain film. In the switch of the present invention, light from a particular input fiber is focused by an input lens onto its own stripe domain deflecting element. An image of the end of the fiber, magnified by a factor of 10 is formed on the surface of the deflector. The deflected light is focused by a delay lens onto one facet of a multifaceted pyramidal reflector which is really the pavilion of a gem. Thus, an image of the fiber tip is also formed on the facet of the gem. The angle of incidence of the deflected light onto the facet determines which output fiber the light reaches. Each output fiber has an output lens which causes an image to form on the tip of the output fiber. This lens demagnified the image of the tip of the input fiber and focuses the light into the fiber.

This device forms an imaging system, with images of the tip of an input fiber forming on the deflector, on the gem, and finally on the output fiber. For full efficiency, it is necessary to be able to image any input fiber onto the end of any output fiber, and, indeed, to be able to image all input fibers simultaneously onto the end of any output fiber. In order for the light to stay in the output fiber it is also necessary that the light enter within the numerical aperture of the output fiber. These two conditions put constraints on the design of the switchboard and are the reason for the multifaceted reflector. Each output lens is focused on the gem, so the output lens focuses all of the light into the output fiber. This changes what essentially is an analogue deflector system into a digital deflector system. Small changes in deflection angle don't cause the light to miss the output fiber; all the light has to do to enter the proper fiber is to hit the corresponding output lens. Since light beams don't block each other when they cross, all inputs and outputs can be operating simultaneously, in a nonblocking fashion.

The light that is reflected from the mirror 15' and deflected by said deflector element 14' enters an associated relay lens 21. This lens forms the image of the deflector face onto one facet 23 of a multi-faceted reflector 17 which may be a real or artificial jewel or gem with a front surface reflective coating. The light thus enters one of the output lenses, 20' or 20''. Which output lens the light enters is determined by the direction the light was reflected and deflected by the controllable deflecting elements, 14', 14''. The chosen output lens then images the facet onto the face of its associated output fiber (for example, the lens 20' and the fiber 18'). Therefore, the face of the input fiber is always imaged onto the face of the output fiber regardless of the state of the deflector, unless, of course, the deflected light actually misses the output lens. This cures the first two disadvantages mentioned above with regard to the prior art, in that small differences in the state of the deflector do not influence the position of the image at all, while large differences in the state of the deflector cause the light to miss that output lens altogether and to enter another output lens. In this sense, this lens system changes an analogue deflector into a digital one.

The third disadvantage in prior devices is that the input fibers are as closely spaced as possible. This presents the problem of spacing input lenses closely together also, and the even worse problem of spacing the deflector elements closely together. In the present invention the lenses or deflectors are not closely spaced, but instead the images of the input fibers are placed next to each other. Each input fiber has its own facet of the reflector 17 assigned to it (such as the facet 23) and an image of the input fiber is projected onto the corresponding facet. The deflectors can then be spaced far apart where the magnetic field from one deflector won't perturb its neighboring deflectors, which results in an increase of at least a factor of four in potential switchboard capacity.

When the input lens 12' creates an image of the tip of the input fiber 10' on the face of the deflector element 14', that image is magnified, e.g., by a factor of 10. The relay lens 21 typically operates at close to unit magnification. The output lenses demagnify, e.g., by factor of 20, so that the images of all the facets of the reflector 17 fit onto the face of the output fibers. This provides the output fiber with the capability of receiving light from any input fiber 10'.

Figure 4:
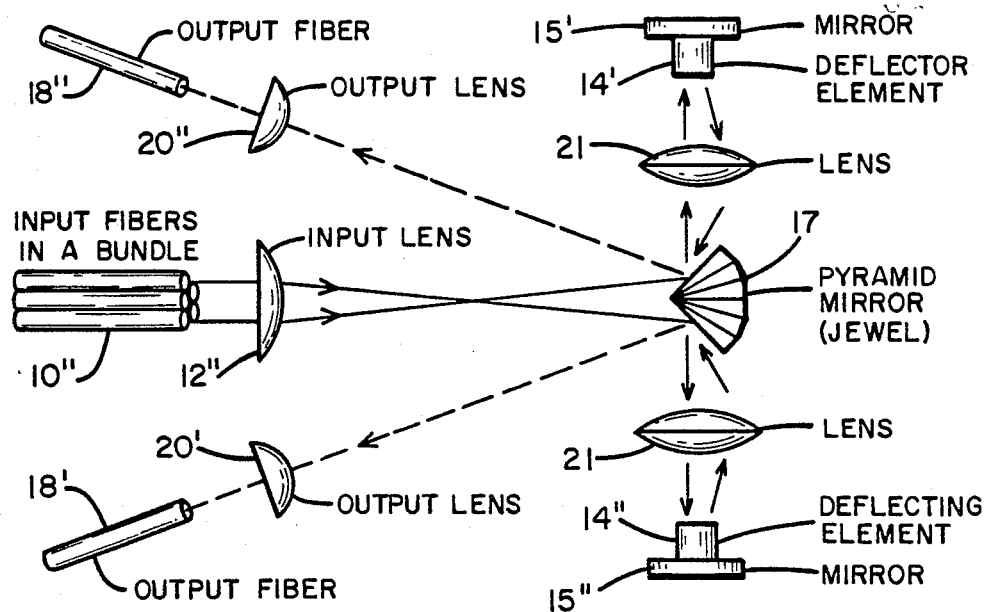
FIG. 4 is a schematic representation of an alternate embodiment of the present invention.

When the deflector element 14' deflects the light up, as shown by the solid-line rays, the light will strike the facet 23 of the reflector 17 at such an angle that it will enter the output lens, 18' on the left side of the figure. However, it the deflector, 14', had deflected the light down, as shown by the dashed-line rays, then the light will be reflected from the facet 23 at a shallower angle into a second output lens 20'' and output fiber 18'' combination, which is shown to the right of the previous one. Thus, the deflector element 14' controls the direction of the reflection of the light from the facet 23 and this controls which output fiber the light enters. The compensating lens 34 is an optional element, the desirability of which is discussed subsequently with reference to FIGS. 4 and 5. The input fibers are shown in a ring below a ring of deflectors, which in turn lie below a ring of output fibers.

An alternate embodiment is shown in FIG. 3 in which all of the input fibers 10" are secured together in a close packed bundle, and a single input lens 12" focuses all the input fiber ends onto the proper facets of a reflector 17. This has the advantage of eliminating most of the input lenses, but also has the disadvantage that the input fibers must have most of their cladding etched off before they are glued into the bundle. The resulting bundle is also very fragile and the individual fibers tend to break spontaneously. The ease in assembling the configuration of FIG. 2, therefore, generally will often offset the added cost of the additional input lenses, but there are applications for which the embodiment of FIG. 3 may be preferred.

It is desirable to have the angle between the rays entering an output fiber and the axis be small, because if that angle exceeds the acceptance angle of the output fiber, the light will not be accepted. This angle becomes larger when the size of the cores of the input fibers becomes larger, or the number of input fibers becomes larger. Therefore, a modification of FIG. 2 is desirable when the size of the core of the input fiber becomes significantly large, or the number of input fibers becomes significantly large. The optional lens 34 may be added at the image plane to reduce the angles between the axis and the light rays as they enter the output fibers, as shown in FIG. 2 where the lens 34 is located at the image plane near the tip of the multifaceted reflector 17.

Figure 5:
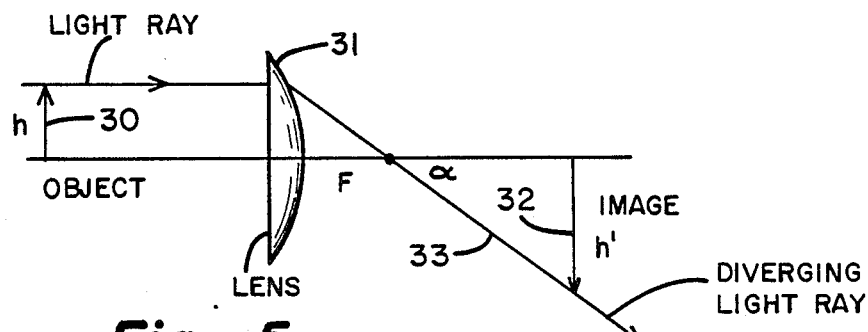
FIG. 5 is an illustration showing how initially collimated light is caused to diverge at an image.
Figure 6:
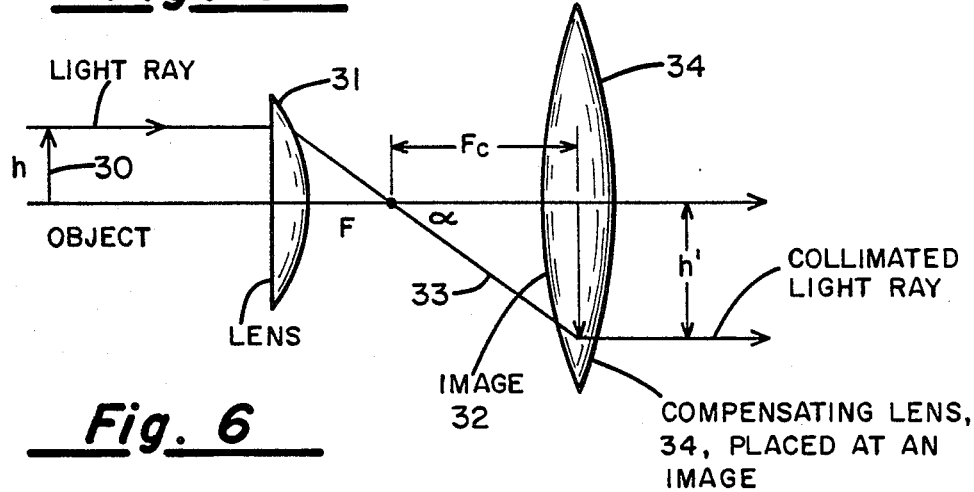
FIG. 6 is an illustration that shows how a lens placed at an image causes the light to become collimated again.

The manner in which the lens 34 modifies operation is now described. Assuming that light starts out collimated from an image, 30, as shown in FIG. 5 and that it ends up, after passing through the lens 31, as an uncollimated image at the image plane, 32. The angle, $\alpha$, between the most divergent ray, 33, and the axis is given by $$\alpha = \text{arc tan } h/F$$

where h is the distance between the extreme end of the object in FIG. 5 and the central axis of the lens 31 and F is the focal length of the lens. If, however, a compensating lens, 34 is located at the image plane as shown in FIGS. 2 and 6, then light leaving the lens 34 is re-collimated, provided the focal point of the compensating lens 34 coincides with the focal point of the imaging lens 31. In general, a compensating lens at an image contributes a convergence angle $\alpha_c$ of $$\alpha_c = -\text{arc tan } h'/F_c$$

where h' is the distance between the extreme end of the image and the central axis of the compensating lens 34, and $F_c$ is the focal length of the lens. The strength of the compensation is inversely proportional to the focal length of the compensating lens. Regardless of the amount of divergence caused by a set of imaging lenses, then divergence can be corrected by a single compensating lens of the proper focal length.

As an example, the total divergence angle in radians, $\alpha_t$, at the output fiber, caused by the three lens systems of FIG. 2 or FIG. 3 can be shown to be $$\alpha_T h \{(M_3 M_2 F_1)^{-1} M_1 (M_3 F_2)^{-1} + M_1 M_2 / F_3\}$$

where h is the size of the object (for example the radius of the input bundle in FIG. 4) and where $M_1$ is the magnification of the input lens, $M_2$ is the magnification of the relay lens, $M_3$ the magnification of the output lens, and $F_1$, $F_2$, and $F_3$, are the focal lengths of the input, relay, and output lenses respectively. Here the small angle approximation arc tan $\alpha_T = \alpha_T$ has been used. The required focal length $F_c$ of the compensating lens at the tip of the reflector can be shown to be given by:

$$F_c^{-1} = (M_1 M_2^2 f_1)^{-1} + (M_2 F_2)^{-1} M_3 / F_3$$

For example, if $M_1 = 10, M_2 = 1, M_3 = 1/20, F_1 = 6.5$ mm, $F_2 = 20$ mm, and $F_3 = 10$ mm, the $F_c$ should be 14.2 mm for optimal compensation.

We claim:

1. A fiber-optic switchboard comprising of n input optical fibers, n input lenses, n relay lenses, n deflector means, m output optical fibers, m output lenses, and a multifaceted reflector means with n facets wherein n and m are positive integers of two or more, positioned and constructed such that:

each of said input optical fibers is associated with one of said input lens, one of said deflector means, one of said relay lens and one of said facets of said reflector means;

each of said output optical fibers is associated with one of said output lens;

each of said input optical fibers is imaged by an associated one of said input lens onto the surface of an associated one of said deflector means;

each of said deflector means is imaged by an associated one of said relay lenses onto an associated one of said facets on the reflector means;

each output lens images all of said facets of said reflector means onto an associated one of said output optical fibers, and each of said light deflector means is capable of steering light impinging on it to any one of said output lenses.

2. A fiber-optic switchboard as claimed in claim 1 wherein said deflector means comprises a stripe domain film means.

3. A fiber-optic switchboard as claimed in claim 1 comprising a compensating lens located at an image plane proximate said reflector means.

4. A fiber-optic switchboard as claimed in claim 2 comprising a compensating lens located at an image plane proximate said reflector means.

5. A fiber-optic switch as claimed in claim 2 wherein said stripe domain film means has mirror means associated therewith so that said stripe domain means is intermediate said mirror means and its associated input optical fiber.

6. A fiber-optic switchboard as claimed in claim 5 comprising a compensating lens located at an image plane proximate said reflector means.

7. A fiber-optic switchboard comprising n input optical fibers arranged in a close packed bundle, a single input lens, n deflector means, n relay lenses, a multifaceted reflector means with n facets, a plurality of m output lenses, and m output optical fibers positioned and constructed such that:

each of said inpout optical fibers is associated with one of said deflector means, one of said relay lens, and one of said facets of said reflector means;

each of said output lens is associated with one of said output optical fibers;

each of said input fibers is imaged by said single input lens onto only an associated one of said facets of said reflector means;

each of said facets is imaged by an associated one of said relay lenses onto the surface of an associated one of said deflector means;

each said light deflector means is imaged back on said associated facet by said associated relay lens;

each said output images all the facets of said reflector means onto the end of said associated output optical fiber; and each said light deflector means element is capable of steering light impinging on it to any one of said output lenses.

8. A fiber-optic switcboard as claimed in claim 7 wherein said deflector means comprises a stripe domain film means.

9. A fiber-optic switchboard as claimed in claim 7 comprising a compensating lens located at an image plane proximate said reflector means.

10. A fiber-optic switchboard as claimed in claim 8 comprising a compensating lens located at an image plane proximate said reflector means.

11. A fiber-optic switch as claimed in claim 8 wherein said stripe domain film means has mirror means associated therewith so that said strip domain means is intermediate said mirror means and its associated input optical fiber.

12. A fiber-optic switchboard as claimed in claim 11 comprising a compensating lens located at an image plane proximate said reflector means.

13. A fiber-optic switchboard comprising n input lens means, and n input optical fibers, n prism reflector means, n relay lenses, n variable state deflector means, m output optical fibers, m output lenses and a multifaceted reflected means with n facets, wherein n and m are positive integers of two or more, positioned and constructed such that:

light from each of said input fibers is reflected by an associated one of said prism reflector means and the face of each of said input optical fibers is imaged by an associated one of said input lens means onto an associated one of said deflector means each of said deflector means is imaged through an associated one of said relay lens onto an associated one of said facets of said reflector means;

each output lens images all of said facets of said reflector means onto an associated one of said output optical fibers, and the state of the said deflector element means selects the output lens into which said associated one of said input optical fibers is imaged.

14. A fiber-optic switchboard as claimed in claim 13 wherein said deflector means comprises a stripe domain film means.

15. A fiber-optic switchboard as claimed in claim 13 wherein said input lens means comprises n input lenses and each of said input fibers is imaged by an associated one of said input lens onto an associated one of said deflecting means.

16. A fiber-optic switchboard as claimed in claim 14 wherein said input lens means comprises n input lenses and each of said input fibers is imaged by an associated one of said input lens onto an associated one of said deflecting means.

17. A fiber-optic switch as claimed in claim 13 wherein said stripe domain film means has mirror means associated therewith so that said stripe domain means is intermediate said mirror means and its associated input optical fiber.

18. A fiber-optic switchboard as claimed in claim 17 wherein said input lens means comprises n input lenses and each of said input optical fibers is imaged by its own input lens onto an associated one of said deflecting means.

19. A fiber-optic switchboard as claimed in claim 13 wherein said input optic fibers are arranged together in a close packed bundle and said input lens means comprises a single input lens.

20. A fiber-optic switchboard as claimed in claim 14 wherein said input optic fibers are arranged together in a close packed bundle and said input lens means comprises a single input lens.

21. A fiber-optic switch as claimed in claim 20 wherein said stripe domain film means has a mirror means associated therewith so that said stripe domain means is intermediate said mirror means and its associated input fiber.

* * * * *